UNITED STATES PATENT OFFICE.

GEORGE OSBORNE PENN, OF ADELAIDE, SOUTH AUSTRALIA, AUSTRALIA.

PROCESS FOR PRESERVING FRUIT PEELS AND RINDS BY IMPREGNATION WITH SUGAR.

1,145,333. Specification of Letters Patent. Patented July 6, 1915.

No Drawing. Application filed October 21, 1913. Serial No. 796,484.

*To all whom it may concern:*

Be it known that I, GEORGE OSBORNE PENN, subject of the King of Great Britain and Ireland, residing at Flinders street, Adelaide, South Australia, Australia, have invented certain new and useful Improvements in Processes for Preserving Fruit Peels and Rinds by Impregnation with Sugar, of which the following is a specification.

My invention consists in an improved process for the treatment of fruit peel and fruit rind, and it has for its object the preservation of those products and the manufacture of "candied peel."

In carrying out the invention, the citrus or other fruit is halved by cutting and the juice expressed from the pulp. The juice may however be left in the pulp. The half pieces are pickled in strong brine for a period varying from two to twelve months whereby a softening of the cellular tissue is effected. After removal from the brine, the pieces are soaked and repeatedly washed in fresh water to remove the brine, and the pulp is separated from the peel or rind. The latter is placed in a closed digester and subjected to steaming under a pressure of about ten pounds per square inch for a period of from ten to thirty minutes whereby the tissue is opened and further softened. The peel or rind is now packed on trays and placed in a closed chamber with a thick syrup having a density of about forty degrees Baumé, said syrup completely covering the peel or rind. The syrup is at an initial temperature of 100 degrees Fahr. approximately at the commencement of the operation but the temperature falls to normal during the treatment, which is continued for a period of about twelve hours under a pressure varying from 130 to 175 lbs. per square inch. After a lapse of about twelve hours the density of the syrup will have fallen, and it is then run off and a fresh charge of thick syrup at 100 degrees Fahr. is run in and the pressure again raised, the temperature being allowed to fall as before so that at the conclusion of the treatment which extends for a second term of twelve hours the temperature approximates to normal atmospheric temperature. The peel or rind thus impregnated with the syrup is now removed from the closed chamber and submitted to a drying process, after which it is immersed in a very heavy syrup and drained off. This syrup on drying assumes a crystalline form producing a "candied product."

I would have it understood that as the process throughout is of a mechanical nature, it is not obligatory to use the precise temperature or density of solution specified or to maintain the treatment for the period specified or to use the precise range of degree of pressure specified. The process as described is however the best method known to me for the manufacture of candied peels.

The treatment in strong syrup may be repeated oftener than twice, but in practice one repetition is found sufficient.

What I claim as my invention and desire to secure by Letters Patent is:—

1. A process of manufacturing candied peel wherein the pieces are pickled in strong brine for an extended term, soaked and washed in fresh water to remove the brine, steamed under pressure, placed in a closed chamber and subjected, under a high pressure to a plurality of impregnations of dense syrup, and finally desiccated, immersed in a very heavy syrup and drained off.

2. A process of manufacturing candied peel wherein the pieces are pickled in strong brine for an extended term, soaked and washed in fresh water to remove the brine, steamed under pressure, placed in a closed chamber and subjected under a high pressure to an impregnation of dense warm syrup which after cooling is removed, further subjected under a high pressure to another impregnation of dense warm syrup, and finally desiccated, immersed in a very heavy syrup and drained off.

3. A process of manufacturing candied peel wherein the pieces are pickled in strong brine for an extended term, soaked and washed in fresh water to remove the brine, steamed under a pressure of approximately ten lbs. per square inch for a period of ten to thirty minutes, placed in a closed chamber and subjected under a pressure of 130 to 175 lbs. per square inch to an impregnation of syrup having approximately an initial density of 40 degrees Baumé and an initial temperature of 100 degrees Fahrenheit for a period of about 12 hours until the temperature falls to normal, such impregnation being repeated with a fresh supply of syrup, and finally desiccated, immersed in a very heavy syrup and drained off.

In testimony whereof I have affixed my signature in presence of two witnesses.

GEORGE OSBORNE PENN.

Witnesses:
H. A. WOOD,
HARRY LAYCOCK.